US008814530B2

(12) United States Patent
Kamibayashi et al.

(10) Patent No.: US 8,814,530 B2
(45) Date of Patent: Aug. 26, 2014

(54) NACELLE ROOF STRUCTURE OF WIND TURBINE GENERATOR

(71) Applicant: Mitsubishi Heavy Industries, Ltd., Tokyo (JP)

(72) Inventors: Masakazu Kamibayashi, Tokyo (JP); Haruhiko Hirano, Tokyo (JP); Tomohiro Numajiri, Tokyo (JP); Kenji Ito, Yokohama (JP); Ikuo Honda, Yokohama (JP); Yoshihiro Fujioka, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/752,841

(22) Filed: Jan. 29, 2013

(65) Prior Publication Data

US 2013/0142664 A1 Jun. 6, 2013

Related U.S. Application Data

(63) Continuation of application No. PCT/JP2011/078027, filed on Dec. 5, 2011.

(30) Foreign Application Priority Data

Dec. 6, 2010 (JP) .................................. 2010-271929

(51) Int. Cl.
    *F01D 25/24* (2006.01)
(52) U.S. Cl.
    USPC ...................................................... 416/244 R
(58) Field of Classification Search
    USPC ........... 52/537, 283, 741.3, 79.1, 79.9, 79.13, 52/783.11, 783.19; 416/244 R; 415/201
    See application file for complete search history.

(56) References Cited

U.S. PATENT DOCUMENTS 3,132,446 A * 5/1964 Schleig ............................ 52/537
3,188,131 A * 6/1965 Attwood ......................... 52/270

(Continued)

FOREIGN PATENT DOCUMENTS

DE 102006001931 A1 7/2007
JP H07-062758 A 3/1995

(Continued)

OTHER PUBLICATIONS

PCT, "International Search Report for PCT/JP2011/078027", Feb. 14, 2012.

*Primary Examiner* — Edward Look
*Assistant Examiner* — Aaron R Eastman
(74) *Attorney, Agent, or Firm* — Manabu Kanesaka; Kenneth M. Berner; Benjamin J. Hauptman

(57) ABSTRACT

To provide a nacelle roof structure of a wind turbine generator, where the nacelle roof structure is capable of reducing stress concentration on joints of a roofing member divided into multiple parts to accommodate growing size of a nacelle as well as improving transport efficiency of the roofing member. A nacelle roof structure of a wind turbine generator, with a top face of a nacelle being covered with a plate-type roofing member (30), in which the roofing member (30) has a joining structural portion (32) in which roof shingles (31) that divide the roofing member into a plurality of parts in a main-shaft direction are combined and plate couplings provided at opposite ends in the main-shaft direction are fastened together by being laid one on top of another; and two or more of the roof shingles (31) are equal in cut length in the main-shaft direction.

12 Claims, 6 Drawing Sheets

(56) References Cited

U.S. PATENT DOCUMENTS

| | | | | |
|---|---|---|---|---|
| 4,128,984 | A | * | 12/1978 | Charbonneau et al. .... 52/746.11 |
| 4,133,161 | A | * | 1/1979 | Lester ........................... 52/748.1 |
| 4,819,398 | A | * | 4/1989 | Dameron ......................... 52/529 |
| 5,524,409 | A | * | 6/1996 | Kaiser ........................... 52/588.1 |
| 5,706,614 | A | * | 1/1998 | Wiley et al. .................... 52/79.1 |
| 6,959,519 | B2 | * | 11/2005 | Adriaansen ..................... 52/537 |
| 7,104,020 | B1 | * | 9/2006 | Suttle ............................ 52/551 |
| 2004/0045231 | A1 | * | 3/2004 | Madden .......................... 52/202 |
| 2004/0177582 | A1 | * | 9/2004 | Adriaansen ..................... 52/537 |
| 2009/0129931 | A1 | * | 5/2009 | Stiesdal ................... 416/204 R |
| 2010/0124507 | A1 | * | 5/2010 | Wallace et al. ............... 416/248 |
| 2010/0126093 | A1 | * | 5/2010 | Davis et al. .................... 52/283 |
| 2010/0239416 | A1 | | 9/2010 | Mogensen et al. |
| 2011/0076140 | A1 | | 3/2011 | Elsenheimer et al. |

FOREIGN PATENT DOCUMENTS

| | | |
|---|---|---|
| JP | H07-165172 A | 6/1995 |
| JP | H07-256452 A | 10/1995 |
| WO | 2007/132408 A2 | 11/2007 |
| WO | 2009/150162 A2 | 12/2009 |
| WO | 2010/102635 A2 | 9/2010 |

* cited by examiner

FIG. 6
(a)
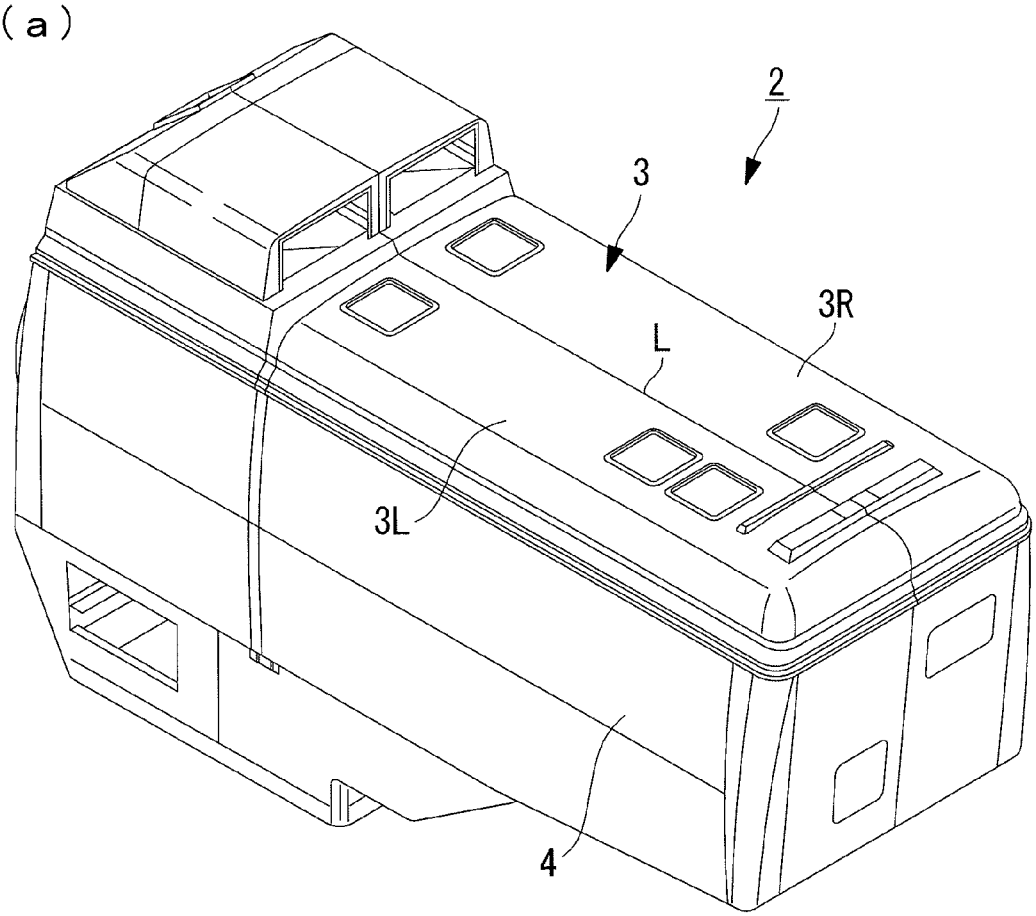
(b)
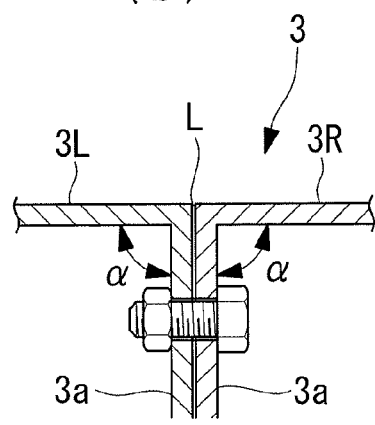

NACELLE ROOF STRUCTURE OF WIND TURBINE GENERATOR

RELATED APPLICATIONS

The present application is a continuation application of PCT/JP2011/078027 filed Dec. 5, 2011, which claims priority from, Japanese Application no. 2010-271929, filed Dec. 6, 2010.

BACKGROUND OF THE INVENTION

1. Field of the Invention

The present invention relates to a nacelle roof structure of a wind turbine generator.

2. Description of Related Art

A wind turbine generator is designed to generate electric power using a generator which is driven as a rotor head equipped with wind turbine blades is rotated by wind power and the rotation is speeded up by a gear box. The rotor head is installed on an end portion of a nacelle which, being mounted on a wind turbine tower, is capable of yawing, and is supported in such a way as to be able to rotate around a substantially horizontal transverse rotation axis.

A nacelle cover adapted to cover the nacelle of the wind turbine generator is generally constructed by connecting plural fiber reinforced plastic (FRP) panels and a connection structure for the panels needs to be designed to be able to prevent infiltration of rainwater from outside the nacelle cover.

Also, panel connections are generally joined by bolts, but when the nacelle cover is subjected to external forces caused by wind pressure, snow cover, or the like, the panel connections joined by bolts become the weakest part in terms of strength. Therefore, the panel connections need to have a structure free from high material strain.

In a conventional nacelle roof structure shown in FIG. 6, a roofing member 3 adapted to cover a top face of a nacelle 2 is configured by integrating roof shingles 3L and 3R which divide the nacelle into two parts—right and left parts—in a width direction and is mounted by being connected with upper end portions of nacelle side-walls 4. Generally, the nacelle 2 is shaped substantially as a rectangular parallelepiped. When viewed from above, the nacelle 2 is rectangular in planar view and the long edge corresponds to a front-rear direction which coincides with a main-shaft direction while the short edge corresponds to a width direction.

The roof shingles 3L and 3R are joined by fastening respective flanges 3a by bolt connection as shown in FIG. 6, (b) and a joining line L between the roof shingles 3L and 3R extends to a length substantially equal to that of the long edge (main-shaft direction) of the nacelle 2.

In this case, the flanges 3a joining together the roof shingles 3L and 3R are set at such an angle that a joined portion of the roofing member 3 will be slightly higher when fastening is complete. That is, the flanges 3a at the joint are not set at right angles to the roof shingles 3L and 3R, but have an angle α smaller than 90 degrees (α<90 degrees) by deviating slightly from a right angle such that the joint bent by fastening will be convex upward with respect to an outer periphery of the nacelle 2.

Also, regarding typical structures for wall panel connections, for example, a technique disclosed in Japanese Unexamined Patent Application, Publication No. Hei 7-62758 is known.

Recently, wind turbine generators have been growing in size along with increases in output power, and naturally the shape of the nacelle 2 has been becoming larger. Consequently, the length of the joining line L of the roof shingles 3L and 3R which make up the roofing member 3 is increased in the main-shaft direction (front-rear direction of the nacelle), and furthermore the length from the joining line L to the nacelle side-walls 4 is increased as well.

On the other hand, since no support member is connected to the roofing member 3 except the nacelle side-walls 4, stresses will concentrate on a bolt-connected flange coupling under the load of snow cover or the like.

When the roofing member 3 becomes larger along with the nacelle shape, the dimension from the joining line L to the nacelle side-walls 4 increases and becomes longer, making it necessary to deal with stress concentration more strictly, and it is feared that the flange coupling described above could be broken in the worst case.

Furthermore, when the roofing member 3 increases in size, the shape of the roof shingles 3L and 3R equipped with the flanges 3a become larger as well due to the right/left two-block structure. Moreover, since the flanges 3a which protrude also grow in size, it becomes difficult to efficiently perform loading and subsequent transport from a manufacturing plant to an installation site.

Also, for example, during maintenance after installation of the wind turbine generator, it becomes necessary to perform the operation of carrying large equipment (including a gear box and generator) installed inside the nacelle cover out of the nacelle cover in a high-elevation, high-wind environment. For that, it is necessary that the roofing member 3 which is part of the nacelle cover of the wind turbine generator is structured to be able to be removed and reinstalled easily. In particular, the roofing member 3 which makes up roof part of the nacelle cover needs to be made removable to take sufficient measures against intrusion of rain water.

On the other hand, the wall panel connection structure disclosed in Japanese Unexamined Patent Application, Publication No. Hei 7-62758 is a connection structure for wall panels used in housing and is different from a nacelle roof structure of a wind turbine generator, which uses fiber reinforced plastic panels.

BRIEF SUMMARY OF THE INVENTION

The present invention has been made in view of the above circumstances and has an object to provide a nacelle roof structure of a wind turbine generator, where the nacelle roof structure, which makes up a nacelle cover, is capable of reducing stress concentration on joints of a roofing member divided into multiple parts to accommodate growing size of a nacelle as well as improving transport efficiency of the roofing member.

To solve the above problem, the present invention provides the following solutions.

The present invention provides a nacelle roof structure of a wind turbine generator, with a top face of a nacelle being covered with a plate-type roofing member, wherein: the roofing member has a joining structure in which roof shingles that divide the roofing member into a plurality of parts in a main-shaft direction are combined and plate couplings provided at opposite ends in the main-shaft direction are fastened together by being laid one on top of another; and two or more of the roof shingles are equal in cut length in the main-shaft direction.

With the nacelle roof structure of a wind turbine generator, the roofing member covering the top face of the nacelle has a joining structure in which the roof shingles that divide the roofing member into a plurality of parts in the main-shaft direction are combined and plate couplings provided at opposite ends in the main-shaft direction are fastened together by being laid one on top of the other, and two or more of the roof shingles are equal in cut length in the main-shaft direction. Consequently, the joining structure in which the plate couplings of the roof shingles are fastened together by being laid one on top of another extends in a short-edge (width) direction of the nacelle orthogonal to the main-shaft direction, preventing excessive stress concentration on the joining structure. Also, since two or more roof shingles are equal in cut length in the main-shaft direction, it is possible to reduce manufacturing cost through adoption of vacuum molding or sharing of a molding tool as well as to perform efficient transport by piling up roof shingles of a same size.

In the invention described above, preferably corrugations substantially parallel to the plate couplings are formed on the roof shingles in a neighborhood of the plate couplings. This increases rigidity of the joining structure in which the roof shingles are laid in an overlapping manner.

In this case, preferably each of the roof shingles includes curved portions located on opposite end sides in a width direction orthogonal to the main-shaft direction and configured to shift direction downward toward roof couplings coupled to nacelle side-walls; and the corrugations are formed up to a neighborhood of roof couplings including the curved portions. This further increases rigidity and simplifies coupling connection with the nacelle side-walls by making roof side-walls without corrugations planar.

Also, the corrugations may be made concave with respect to external part of the nacelle. This allows the corrugations to be used as discharge channels, improving water drainage on roof part of the nacelle.

In the invention described above, preferably the roof shingles are laid in an overlapping manner with the plate coupling on a windward side being placed on an upper side. This will improve water tightness against rainwater at joints of roof shingle members.

In this case, preferably a stepped portion is provided to make joined surfaces of the plate couplings higher than a roof level. This will further improve water tightness against rainwater.

Also, preferably the plate coupling on the windward side extends a leeward-side end portion of the joined surface placed on the upper side further leeward than start position of a stepped area of the underlying plate coupling on a leeward side. This will even further improve water tightness against rainwater.

BRIEF DESCRIPTION OF THE SEVERAL VIEWS OF THE DRAWINGS

FIG. 6 are diagrams showing an example of a conventional nacelle roof structure of a wind turbine generator, where (a) is an external perspective view of a nacelle and (b) is a sectional view showing a joining structure of roof shingles.

DETAILED DESCRIPTION OF THE INVENTION

Figure 1:
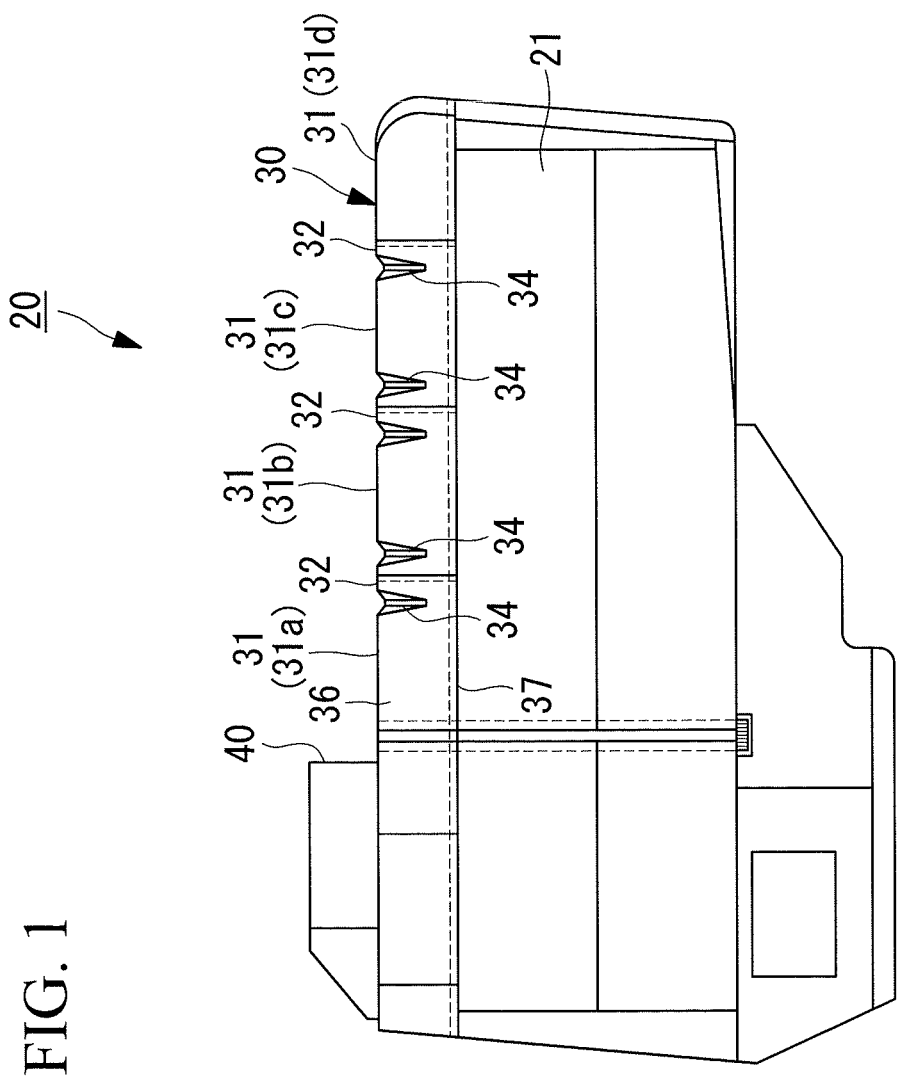
FIG. 1 is an external side view of a nacelle equipped with a nacelle roof structure of a wind turbine generator according to an embodiment of the present invention.
Figure 2:
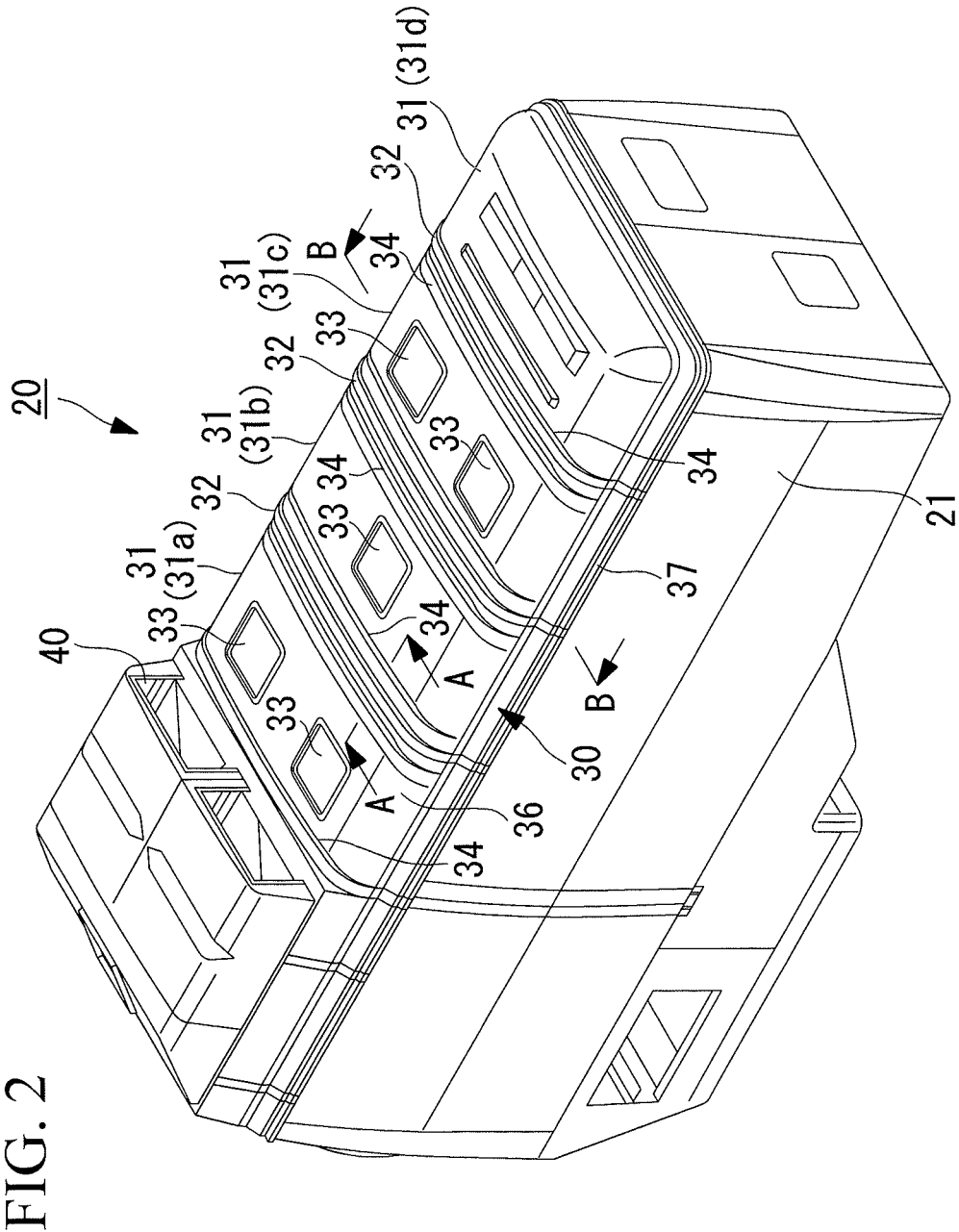
FIG. 2 is an external perspective view of the nacelle shown in FIG. 1.
Figure 3:
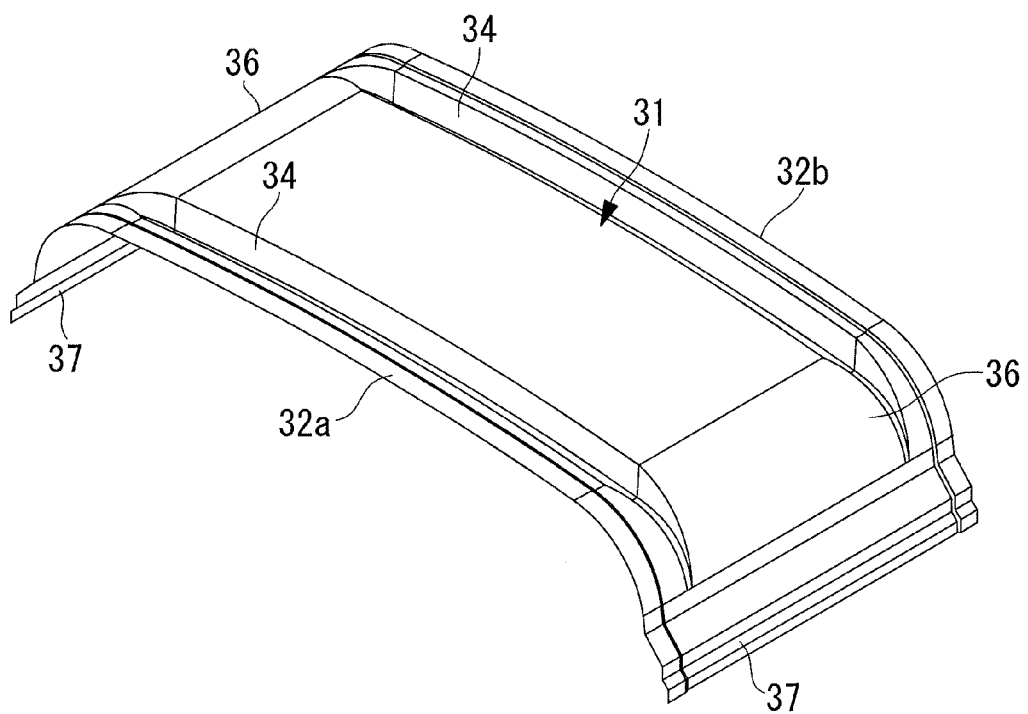
FIG. 3 is a perspective view showing an example of a roof shingle making up part of a roofing member in the nacelle roof structure shown in FIGS. 1 and 2.
Figure 4:
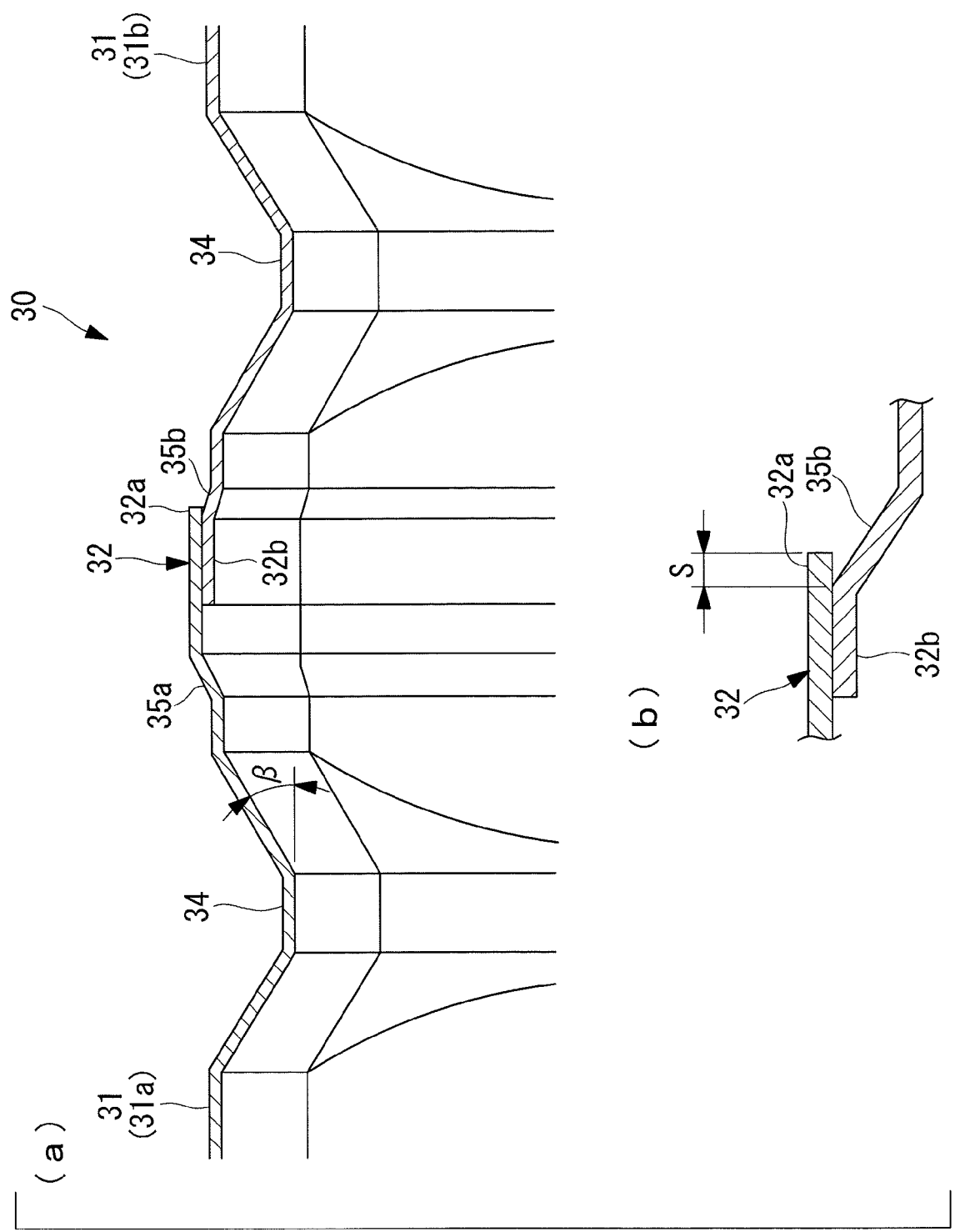
FIG. 4 are sectional views taken along line A-A in FIG. 2, showing (a) a joining structure and corrugations of roof shingles and (b) a joining structural portion in which plate couplings are laid one on top of another.
Figure 5:
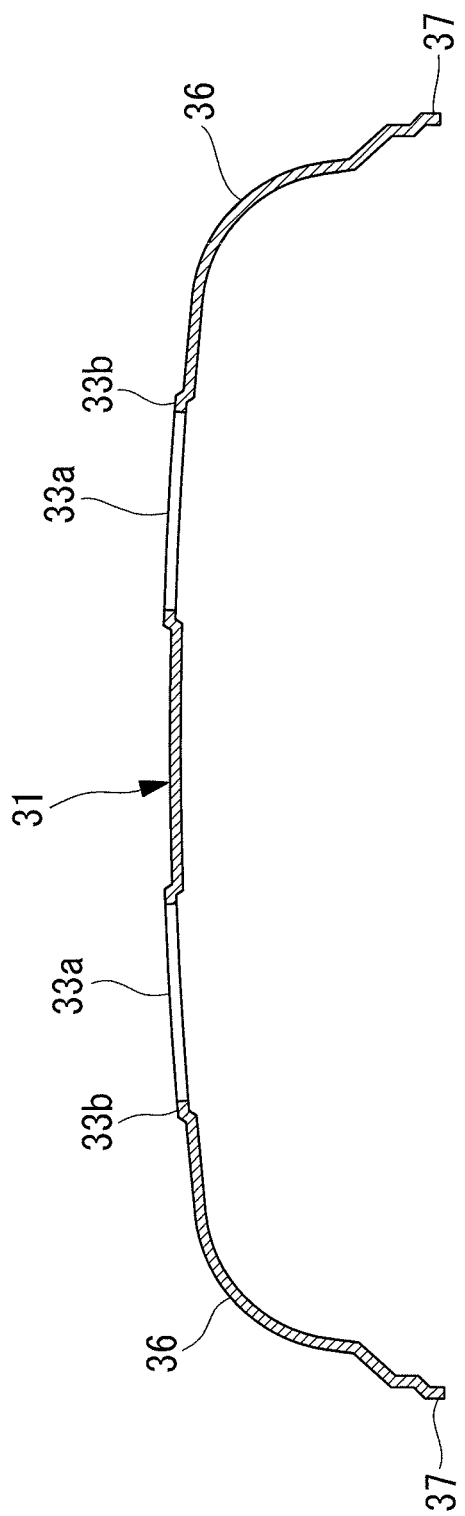
FIG. 5 is a sectional view taken along line B-B in FIG. 2.

A nacelle roof structure of a wind turbine generator according to an embodiment of the present invention will be described below with reference to the drawings. FIGS. 1 and 2 show an exemplary structure of a nacelle to which the nacelle roof structure of a wind turbine generator according to the present invention is applied, FIG. 3 shows a roof shingle making up a roofing member, FIG. 4 is a sectional view taken along line A-A in FIG. 2, and FIG. 5 is a sectional view taken along line B-B in FIG. 2.

In the embodiments described below, the nacelle roof structure of a wind turbine generator is applied to an external wall member covering a nacelle 20 of the wind turbine generator. The nacelle 20 is installed on an upper end portion of a tower and adapted to house equipment such as a gear box and generator installed therein, where the equipment is coupled to a rotor via a main shaft, the rotor being equipped with wind turbine blades. A nacelle cover, which is an external wall member, is made of fiber reinforced plastic (FRP).

In the nacelle roof structure described below, a top opening in a top face of the nacelle 20 is covered with plate-type roofing member 30. The nacelle 20 is shaped substantially as a rectangular parallelepiped. The opening formed in the top face is covered by the roofing member 30 which is detachably mounted on upper end portions of nacelle side-walls 21 forming side-walls. The upper opening is used to carry in and out the equipment installed in the nacelle, with the roofing member 30 removed.

Also, when viewed from above, the nacelle 20 is substantially rectangular in planar view, and a front-rear direction which coincides with a main-shaft direction corresponds to the long edge while a width direction corresponds to the short edge.

The roofing member 30 according to the present embodiment adopts a joining structure in which roof shingles 31 which divide the roofing member 30 into multiple parts in the main-shaft direction are combined using a joining structural portion 32 and plate couplings 32*a* and 32*b* of the roof shingles 31 provided at opposite ends in the main-shaft direction are fastened together by being laid one on top of the other. In the illustrated configuration example, the roofing member 30 is mounted so as to cover the upper opening excluding the foremost roof area in which an exhaust port 40 is installed. In this case, the roofing member 30 is divided in the main-shaft direction into four overlapping roof shingles 31 which, are integrated by the joining structural portions 32. Hereinafter, when it is necessary to distinguish among the four roof shingles 31 resulting from the division, the roof shingles 31 will be denoted by 31*a*, 31*b*, 31*c*, and 31*d* starting from the nacelle's front side on which the rotor (not shown) is mounted.

Two or more of the roof shingles 31 are equal in cut length in the main-shaft direction. In the illustrated example, three roof shingles 31*a*, 31*b*, and 31*c* are substantially identical in shape and equal in cut length in the main-shaft direction.

The roof shingle 31 shown in FIG. 3 provides a basic shape of the roof shingles 31*a*, 31*b*, and 31*c*, which are plate-type members identical in length and shape both in the front-rear direction and width direction. That is, the roof shingles 31*a*, 31*b*, and 31*c* can be formed using molding tools created by individually modifying a molding tool of the same basic shape according to the layout and number of hatch locations 33.

Also, near the plate couplings 32a and 32b of the joining structural portion 32, the roof shingle 31 described above has corrugations 34 formed substantially in parallel to the plate couplings 32a and 32b. The corrugations 34 are convex or concave portions formed on the plate-type roof shingle 31 and are capable of increasing rigidity of the plate-type member especially against an input load tending to fold the roof shingle 31 in the width direction. Thus, the corrugations 34 can also increase rigidity of the joining structural portion 32 located near the corrugations 34 and used to lay the roof shingles 31 in an overlapping manner. In this case, preferably the concavo-convexity of the corrugations 34 has a sectional shape such as a substantially trapezoidal shape with four vertices, i.e., a sectional shape made up of a combination of straight lines with vertices rather than curved surfaces such as arcs. Also, preferably the corrugations 34 are placed close to the plate couplings 32a and 32b, i.e., within a distance smaller than the width of the corrugations 34.

Also, the concave sectional shape of the corrugations 34 described above allows the concave portions to be utilized effectively as discharge channels as well. That is, since the corrugations 34 with the concave sectional shape also function as discharge channels which extend in the width direction of the roof shingle 31 in parallel to the joining structural portion 32, on roof part of the nacelle 20, water drainage on the top face (external surface) of the roofing member 30 is improved and an amount of rainwater reaching the joining structural portion 32 is minimized.

Regarding the sectional shape of the corrugations 34, when, for example, vacuum molding (vacuum infusion process) is adopted, desirably the angle β shown in FIG. 4, (a), is set to 30 degrees or below.

In the joining structural portion 32 of the roofing member 30 described above, preferably the roof shingles 31 are laid in an overlapping manner with the plate coupling 32a or 32b on the windward side being placed on top of the other. That is, as shown in FIG. 4, since the roof shingle 31a, which is on the front side of the nacelle, is always located on the windward side due to yawing, desirably the plate coupling 32a provided on the rear end side of the roof shingle 31a is laid on top of the plate coupling 32a provided on the front end side of the roof shingle 31b.

Consequently, the roofing member 30 of the nacelle 20 is structured such that when flowing from front part to rear part of the nacelle, rainwater under the influence of wind flows on a top face of the plate coupling 32a placed on the upper side, making it difficult for rainwater to enter the nacelle through joined surfaces of the joining structural portion 32. This improves the water tightness of the joining structural portion 32 of the roof panel member 30 against rainwater.

In this case, desirably stepped portions 35a and 35b are provided to make the plate couplings 32a and 32b slightly higher than a roof level in central part such that the joined surfaces of the plate couplings 32a and 32b laid one on top of the other will be higher than the roof level of the roofing member 30. Of the stepped portions 35a and 35b, since the plate couplings 32a and 32b are laid one on top of the other with the one on the windward side being placed on the upper side, the stepped portion 35a provided on the rear end side of the roof shingle 31a on the windward side is slightly larger in step height.

In this way, when the stepped portions 35a and 35b structured as described above are installed on the joining structural portion 32 of the plate couplings 32a and 32b it becomes difficult for rainwater to enter the nacelle through the joined surfaces. This further improves the water tightness of the joining structural portion 32 of the roof panel member 30 against rainwater.

Furthermore, regarding the joining structural portion 32 in which the plate couplings 32a and 32b are laid one on top of the other, desirably the windward-side plate coupling 32a laid on the upper side extends a leeward-side end portion of its joined surface further leeward than start position of an area containing the stepped portion 35b of the underlying plate coupling 32a on the leeward side. That is, desirably the (leeward-side) end portion closer to the rear side of the nacelle of the windward-side plate coupling 32a either coincides in position with the start position of the stepped portion 35b formed on the leeward-side plate coupling 32b or extends further rearward (leeward) on the nacelle than the start position. To describe specifically with reference to FIG. 4, (b), desirably the leeward-side end portion of the plate coupling 32a has an extended portion with a length of S (S≥0) in a leeward direction from the start position of the stepped portion 35b.

When the plate coupling 32a is extended in this way, even if rainwater flows rearward on the roofing member 30 under the influence of wind, the rainwater drops on a sloped surface of the stepped portion 35b a step lower than the joined surface. This further improves the water tightness of the joining structural portion 32 of the roof panel member 30 against rainwater.

In the nacelle roof structure according to the present embodiment configured as described above, the roofing member 30 covering the top face of the nacelle 20 has the joining structural portion 32 in which the roof shingles 31 that divide the roofing member 30 into multiple parts in the main-shaft direction are combined and the plate couplings 32a and 32b provided at opposite ends in the main-shaft direction are fastened together by being laid one on top of the other. Furthermore, two or more of the roof shingles 31 are equal in cut length in the main-shaft direction.

Consequently, the joining structural portion 32 in which the plate couplings 32a and 32b of the roof shingles 31 are fastened together by being laid one on top of the other extends in the short-edge (width) direction of the nacelle 20 orthogonal to the main-shaft direction, reducing the length of the joining structural portion 32 and thereby preventing excessive stress concentration on the joining structural portion 32. Furthermore, since two or more of the roof shingles 31 are equal in cut length in the main-shaft direction, the flangeless structure enables adoption of vacuum molding, manufacturing cost can be reduced through sharing of a basic molding tool, and transport can be performed efficiently by piling up roof shingles 31 of the same size.

To further improve rigidity, desirably each of the corrugations 34 described above is provided by extending from the central part of the roof continuously to near a lower end portion of curved portions (R portions) 36 formed on opposite end sides of the roof shingle 31 in the width direction. The curved portions 36 are configured to shift direction downward toward roof couplings 37 coupled to the nacelle side-walls 21. The roof panel 31 provided with the curved portions 36 configured as described above has a substantially channel-shaped sectional shape in the width direction.

Thus, the corrugations 34 are not only formed in the central portion of the roof shingle 31, but also formed continuously up to near the lower end portions of the curved portions 36 and near the roof couplings 37 located at opposite lower end portions of the roof shingle 31 in the width direction.

The corrugations 34 configured as described above can not only further improve rigidity of the roof shingles 31 and the joining structural portion 32, but also simplify the shape (structure) of the coupling connection between the roof couplings 37 and nacelle side-walls 21 by making roof side-walls without corrugations planar near the lower end portions of the curved portions 36.

Regarding the hatch location 33 provided in the roof shingle 31, if a hatch mounting flange 33b of an opening 33a provided in the roof shingle 31 is set slightly higher than the roof level, for example, as shown in FIG. 5, it is possible to prevent rainwater from entering through the hatch location 33.

Even if the roofing member 30 increases in size to accommodate growth in the size of the nacelle 20, the present embodiment described above, can reduce stress concentration on the joining structural portion 32 of the roofing member 30 divided into multiple roof shingles 31 and improve the rigidity of the joining structural portion 32 as well as the transport efficiency of the roof shingles 31 which are roofing components.

Regarding the joining structural portions 32 of the roofing member 30 described as having a block structure, although the roof shingles 31 are removed during a maintenance operation or the like, since appropriate measures are taken against rainwater intrusion in the joining structural portions 32, the nacelle roof structure of a wind turbine generator has a combination of proper strength, transportation efficiency, and water tightness.

An embodiment of the present invention has been described in detail above with reference to the accompanying drawings, specific configuration of the present invention is not limited to the embodiment described above and, for example, design changes may be made as appropriate without departing from the spirit and scope of the invention.

The invention claimed is:

1. A nacelle roof structure of a wind turbine generator, comprising:
   a plate-type roofing member covering a top face of a nacelle,
   wherein the roofing member comprises roof shingles and plate couplings,
   the roofing member has a joining structure in which the roof shingles that divide the roofing member into a plurality of parts in a main-shaft direction are combined and the plate couplings provided at opposite ends in the main-shaft direction are fastened together by being laid one on top of another,
   two or more of the roof shingles are equal in cut length in the main-shaft direction,
   corrugations substantially parallel to the plate couplings are formed on the roof shingles in a neighborhood of the plate couplings, and
   all of the corrugations are within a distance smaller than a width of the corrugations from the plate couplings.

2. The nacelle roof structure of a wind turbine generator according to claim 1, wherein
   each of the roof shingles includes curved portions located on opposite end sides in a width direction orthogonal to the main-shaft direction and configured to shift direction downward toward roof couplings coupled to nacelle side-walls, and
   the corrugations are formed up to a neighborhood of the roof couplings including the curved portions.

3. The nacelle roof structure of a wind turbine generator according to claim 2, wherein the roof shingles are laid in an overlapping manner with the plate coupling on a windward side being placed on an upper side.

4. The nacelle roof structure of a wind turbine generator according to claim 1, wherein the corrugations are made concave with respect to an external part of the nacelle.

5. The nacelle roof structure of a wind turbine generator according to claim 4, wherein the roof shingles are laid in an overlapping manner with the plate coupling on a windward side being placed on an upper side.

6. The nacelle roof structure of a wind turbine generator according to claim 1, wherein the roof shingles are laid in an overlapping manner with the plate coupling on a windward side being placed on an upper side.

7. The nacelle roof structure of a wind turbine generator according to claim 6, wherein a stepped portion is provided to make joined surfaces of the plate couplings higher than a roof level.

8. The nacelle roof structure of a wind turbine generator according to claim 7, wherein the plate coupling on the windward side extends a leeward-side end portion of the joined surface placed on the upper side further leeward than a start position of a stepped area of an underlying plate coupling on a leeward side.

9. The nacelle roof structure of a wind turbine generator according to claim 6, wherein the plate coupling on the windward side extends a leeward-side end portion of a joined surface placed on the upper side further leeward than a start position of a stepped area of an underlying plate coupling on a leeward side.

10. The nacelle roof structure of a wind turbine generator according to claim 1, wherein one roof shingle has an overlapping surface connecting another roof shingle, and
    an end part of the one roof shingle overlaps with an end part of the another roof shingle at the overlapping surface.

11. The nacelle roof structure of a wind turbine generator according to claim 10, wherein the end part of the one roof shingle is on a top surface of the end part of the another roof shingle, and
    the end part of the one roof shingle is present on a windward side of the nacelle.

12. The nacelle roof structure of a wind turbine generator according to claim 11, wherein the end part of the one roof shingle has an extension part extending outwardly from an edge of the overlapping surface, and
    the extension part has a predetermined length from the edge of the overlapping surface towards a leeward side of the nacelle.

* * * * *